United States Patent
Delgado et al.

(10) Patent No.: US 9,111,290 B2
(45) Date of Patent: Aug. 18, 2015

(54) MANAGING TARGETED CUSTOMER LOYALTY PROMOTIONS

(75) Inventors: Ruben Delgado, Seattle, WA (US);
Kollen Glynn, Newcastle, WA (US);
Siddharth Uppal, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 13/308,048

(22) Filed: Nov. 30, 2011

(65) Prior Publication Data

US 2013/0138492 A1     May 30, 2013

(51) Int. Cl.
*G06Q 30/00*     (2012.01)
*G06Q 30/02*     (2012.01)

(52) U.S. Cl.
CPC ........................... *G06Q 30/02* (2013.01)

(58) Field of Classification Search
USPC ............... 705/7.11–7.42, 14.1–14.73
See application file for complete search history.

(56) References Cited

U.S. PATENT DOCUMENTS

| | | | |
|---|---|---|---|
| 5,832,457 A * | 11/1998 | O'Brien et al. | 705/14.13 |
| 5,923,016 A * | 7/1999 | Fredregill et al. | 235/380 |
| 6,138,911 A * | 10/2000 | Fredregill et al. | 235/383 |
| 6,330,543 B1 * | 12/2001 | Kepecs | 705/14.17 |
| 7,788,129 B2 * | 8/2010 | Antonucci et al. | 705/14.3 |
| 7,813,955 B2 | 10/2010 | Ariff et al. | |
| 7,974,889 B2 | 7/2011 | Raimbeault | |
| 7,979,792 B2 * | 7/2011 | Ammann et al. | 715/243 |
| 8,005,717 B2 * | 8/2011 | Joo | 705/14.73 |
| 2003/0236712 A1 * | 12/2003 | Antonucci et al. | 705/26 |
| 2004/0128197 A1 * | 7/2004 | Bam et al. | 705/14 |
| 2006/0111971 A1 * | 5/2006 | Salesin et al. | 705/14 |
| 2007/0156516 A1 * | 7/2007 | Moissinac et al. | 705/14 |
| 2007/0266130 A1 * | 11/2007 | Mazur et al. | 709/223 |
| 2008/0189360 A1 * | 8/2008 | Kiley et al. | 709/203 |
| 2009/0048916 A1 * | 2/2009 | Nuzum et al. | 705/14 |
| 2009/0106085 A1 * | 4/2009 | Raimbeault | 705/10 |
| 2009/0144201 A1 * | 6/2009 | Gierkink et al. | 705/64 |
| 2009/0271263 A1 * | 10/2009 | Regmi et al. | 705/14.17 |
| 2009/0319348 A1 * | 12/2009 | Khosravy et al. | 705/14.1 |
| 2009/0327111 A1 * | 12/2009 | Bulawa et al. | 705/34 |
| 2010/0070357 A1 | 3/2010 | Fenton | |
| 2010/0250351 A1 | 9/2010 | Gillenson et al. | |
| 2010/0257028 A1 | 10/2010 | Hillerbrand | |
| 2012/0084391 A1 * | 4/2012 | Patel et al. | 709/217 |

OTHER PUBLICATIONS

Baird, et al., "Closing the Sale with the Connected Consumer: The Future of Retail Payments", Retrieved at <<http://www.nrf.com/modules.php?name=Documents&op=viewlive&sp_id=4319>>, Oct. 10, 2009, pp. 28.

(Continued)

*Primary Examiner* — Alan S Miller
(74) *Attorney, Agent, or Firm* — Damon Rieth; Jim Ross; Micky Minhas

(57) ABSTRACT

Targeted customer loyalty promotions are managed by an application through a point of sale contact. The application recognizes a customer visiting a store through communication (e.g. near field communication) with a customer device. The application receives a customer identifier (ID) from the customer device. Using the customer ID, the application retrieves a customer record matching the customer ID from a local data store of the point of sale, a networked data store, or a social network data store. The application determines customer loyalty promotions associated with the customer record and transmits the customer loyalty promotions to the customer.

18 Claims, 9 Drawing Sheets

(56) References Cited

OTHER PUBLICATIONS

McBrearty, Racheal, "The Future of Retail Customer Loyalty RFID Enables Breakthrough Shopping Experiences", Retrieved at <<http://www.cisco.com/web/about/ac79/docs/innov/RFID_Loyalty_IBSG_0614.pdf>>, Jun. 2011, pp. 1-9.

"Mobile in Retail Getting your retail environment ready for mobile", Retrieved at <<http://www.gs1.org/docs/mobile/Mobile_in_Retail.pdf>>, Retrieved Date: Sep. 15, 2011, pp. 34.

* cited by examiner

MANAGING TARGETED CUSTOMER LOYALTY PROMOTIONS

BACKGROUND

Customer loyalty rewards are frequently used sales promotion techniques to entice customers for continued sales. Customer loyalty rewards vary in form and substance. Some retailers provide discount coupons to entice customers to purchase the retailers inventory. Other retailers entice purchasers through free items accompanying a purchase. Yet other retailers provide in store redeemable cards to be used for purchasing an item. Most loyalty rewards have expiration dates. Some loyalty rewards are also event driven and depend on calendar events or time of the year.

Customer loyalty rewards redemption is a task intensive process. Loyalty reward redemption usually includes locating the right reward for the purchase of an item. Customers may end up paying full price when unable to redeem expired rewards. Additionally, on the spot redemption is difficult if not impossible during a check-out process if the customer does not provide the reward. Coupons are easily misplaced and may not apply to item that the customer may wish to purchase. Loyalty points may continue to accrue. However, loyalty points are usually reserved for major redemptions such as flight fair and hotel costs. Loyalty points rarely entice subsequent purchases through value discounts at the time of purchase. On the spot offers such as coupon books at checkout are also seldom used during the present purchase. On the spot offers may entice the customer for a follow up visit but may not apply to an item that the customer wishes to purchase.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing targeted customer loyalty promotions. According to some embodiments, a retail customer record may be created through social loyalty web service lookup. At point of sale or similar locations, a three-tiered customer search may be performed with social loyalty web service as the third tier. A universal customer identifier may be used for customer lookup at retail point of sale and customer purchase history and social loyalty preferences may be used to email promotions and/or push promotions to a mobile device for redemption through the point of sale. In some embodiments, near field communications (e.g. through the customer's mobile device) may be used to communicate customer identifier with no prior customer record existing in the retailer's system. Customer specific, current promotions may be delivered to the customer upon entry at a retailer's site based on previously offered promotions and promotions applicable to the customer's stated interests via a social network. Moreover, email may be used to deliver a customer purchase record with promotions based on social network interests and purchase history.

According to other embodiments, advertisement services may enable retailers to formulate promotions and publish to web service which interfaces with a social network to deliver advertisements to customers based on social network interests and purchase history. Customers may be enrolled into a social network application, which may be accessed by retailers for customer record creation and an advertising network may deliver customer specific promotions. Customer access to club retailers may also be enabled through a near field communications enabled mobile phone. Furthermore, ad hoc transaction retrieval may be enabled from the cloud based on customer identifier entry via a near field communication enabled mobile device.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
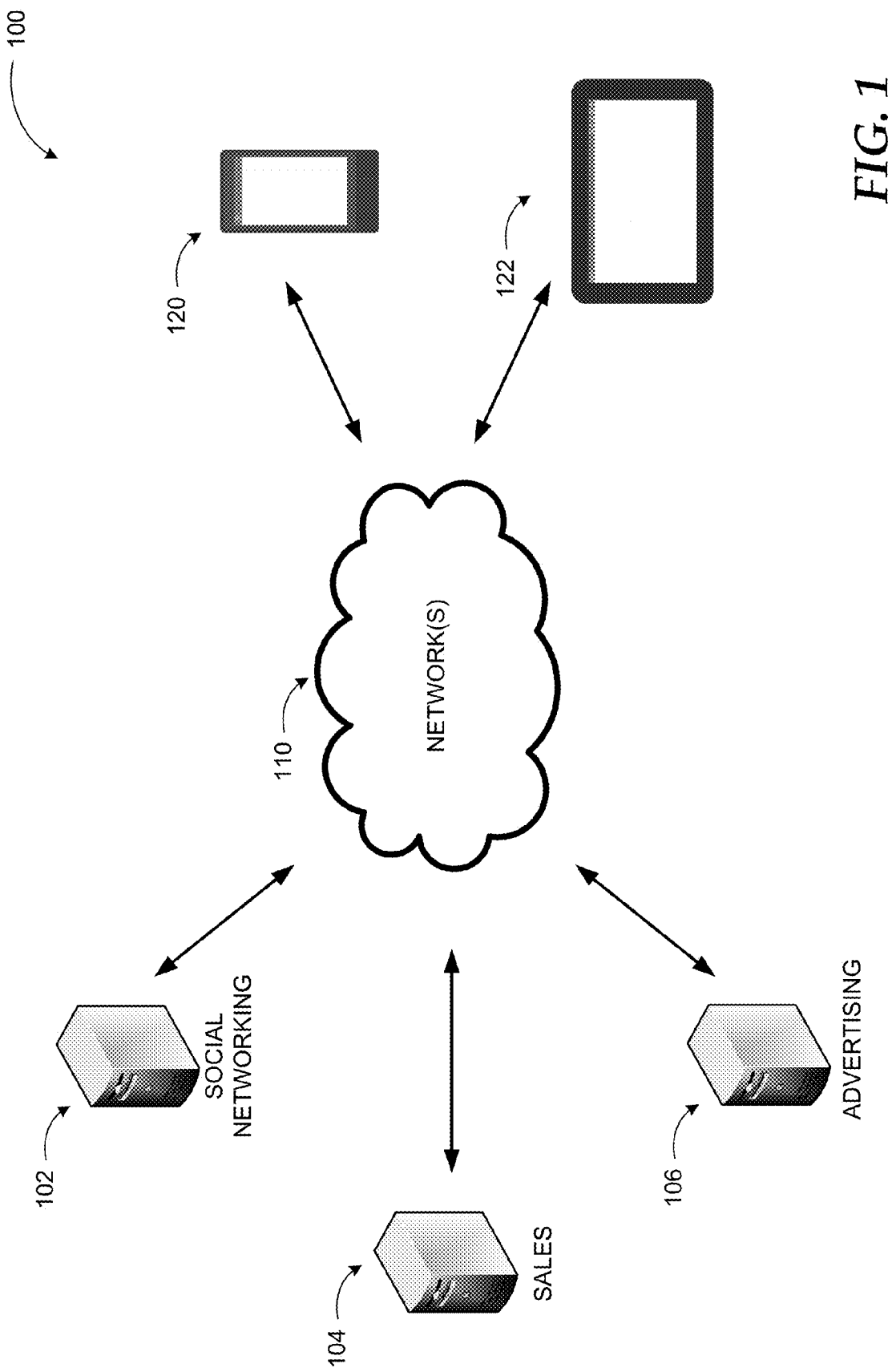
FIG. 1 illustrates an example conceptual network diagram of a system managing targeted customer loyalty promotions.

As briefly described above, an application may manage targeted customer loyalty promotions. The application may receive a customer identifier (ID) from a customer device at a point of sale (POS). The application may retrieve a customer record matching the customer id from a local data store at the POS, a retailer data store common to multiple POS, or a social networking application. The customer record may store customer sales preferences such as sales history. Subsequently, the application may determine customer loyalty promotions associated with the customer record. The application may compare prior sales transactions and match identified purchased items to available customer loyalty promotions. Next, the application may transmit the customer loyalty promotions to the customer. The application may transmit the customer loyalty promotions to the customer device or to another device.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a POS may be a location conducting sales of for-sale items. The POS may be enabled to detect customers and customer transactions through devices on the customers. A customer device may be a mobile phone. Alternatively, the customer device may be simple circuitry embedded in proximity to the customer. An example may be a radio frequency identification (RFID) tag to identify the customer. An application utilizing a customer ID detected at the POS may provide the customer with customer loyalty promotions. Customer loyalty promotions may be variety of sales techniques to promote subsequent sales. Examples include future sales discounts, free items with future purchasers, points offered for a past, present or future sale, etc.

FIG. 1 illustrates an example conceptual network diagram of system managing targeted customer loyalty promotions. Diagram 100 displays network components interacting with an application managing targeted customer loyalty promotions. The application may run in sales server 104. The sales server 104 may be a single server or a cluster of servers providing sales related services to a retailer or similar organization. Sales services may include item inventory and sales transaction management.

The sales server 104 may receive customer loyalty promotions from third parties such as advertising services. Advertising services may be managed by an advertising server 106. The customer loyalty promotions may be targeted to the customer with customer preference information from a social networking application. The sales server 104 may retrieve customer information from a social networking application within a social networking server 102. The sales server 104, advertising server 106, and social networking server 102 may communicate with each other through network(s) 110.

The sales server 104 may deliver a targeted customer loyalty promotion to the customer through customer devices. The sales server 104 may transmit the customer loyalty promotion to a mobile phone 120 or to another device such as a tablet 122. The customer loyalty promotion may be formatted for optimum display to meet mobile device screen requirements.

Figure 2:
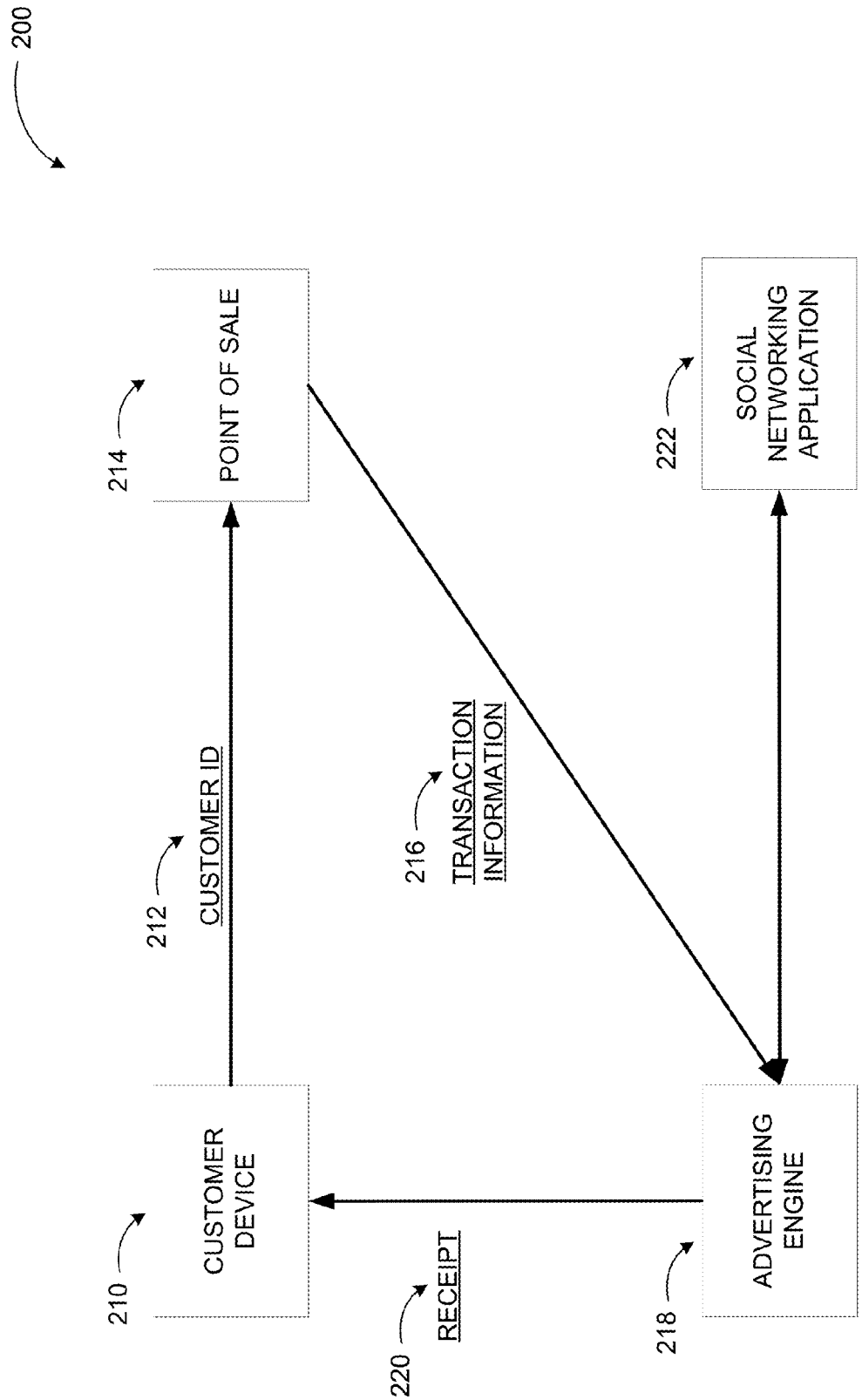
FIG. 2 illustrates example components of a system managing targeted customer loyalty promotions according to embodiments.

FIG. 2 illustrates example components of a system managing targeted customer loyalty promotions according to embodiments. Diagram 200 displays entities managing the customer loyalty promotion generation process. In an embodiment, the customer loyalty promotion may be initiated when a customer enters or approaches a point of sale (POS) location 214. POS location 214 may be a store or any such location capable of detecting a customer device 210 through communications such as near field communications (NFC). For example, a radio frequency identification (RFID) tag embedded into a customer's device 210, a Bluetooth transceiver, a Wi-Fi transceiver, or infrared signals (IR) may be used for near field communications between a POS terminal and the customer's device.

The customer device 210 may transmit a customer identifier (ID) 212 to the POS terminal upon proximity. The POS terminal may communicate with one or more server and utilize the customer ID to record transaction information 216. A transaction may be a sale of a for-sale item. Alternatively a transaction may be a price inquiry. In an example scenario, a customer device may be used to retrieve a for-sale item identifier by querying the for-sale item through various communication technologies such as NFC. The customer device may transmit the for-sale item identifier to the POS terminal and retrieve a price for the for-sale item.

The POS terminal may transmit the transaction information 216 to an advertising engine 218. The advertising engine may analyze the transaction information for customer preferences. The advertising engine 218 may compare the transaction information to previous transaction information located in a customer record to generate an associated customer loyalty promotion. Alternatively, the advertising engine 218 may utilize customer preference information from external sources to create a customer loyalty promotion. According to an embodiment, the advertising engine 218 may transmit the customer loyalty information to a social networking application 222 to expose the customer to the customer loyalty promotion through the customer's account within the social networking application. According to another embodiment, the advertising engine 218 may directly transmit the customer loyalty promotion to the customer device 210 by integrating the customer loyalty promotion to a receipt 220 of the customer transaction. The customer may keep the receipt 220 for record keeping purposes while having convenient access to the customer loyalty promotion for future purchase transactions.

Figure 3:
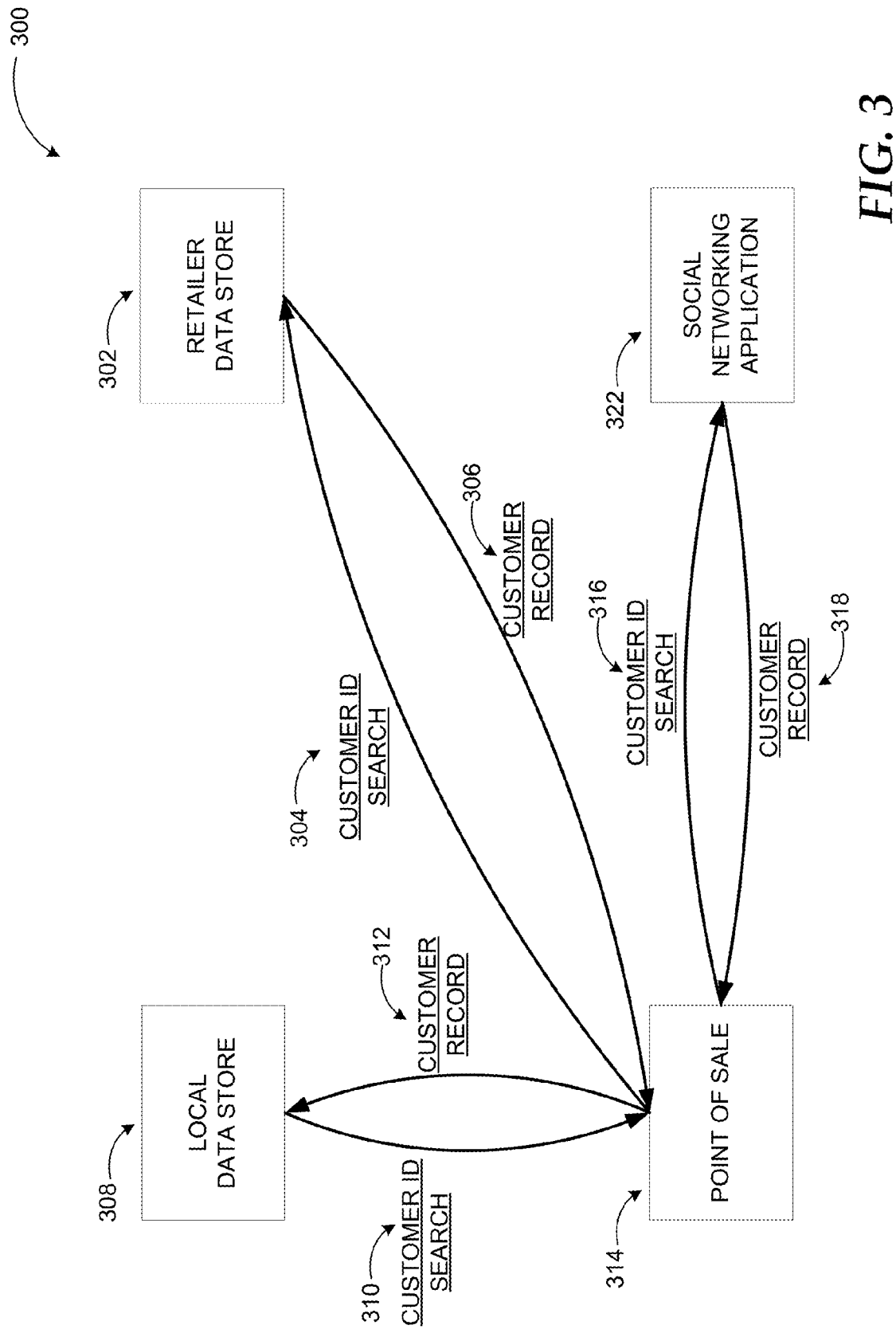
FIG. 3 illustrates other example components of the system managing targeted customer loyalty promotions according to embodiments.

FIG. 3 illustrates other example components of the system managing targeted customer loyalty promotions according to embodiments. Diagram 300 displays entity interactions to retrieve a customer record. POS terminal 314 may query variety of sources to retrieve the customer record. The customer record may be analyzed to extract customer preference information. The customer preference information may be used to create a customer loyalty promotion.

According to an embodiment, the POS terminal 314 may initiate a customer ID search 310 with a local data store 308. The local data store may be a customer database maintained by a sales system associated with the POS terminal 314 to manage a customer record 312. The customer record 312 may include transaction history. The customer record 312 may also include customer profile information such as name, address, phone number, etc. The POS terminal 314 may use the customer record 312 to generate the customer loyalty promotion. The POS terminal 314 may stop a customer record search upon receiving customer record 312. However, the POS terminal 314 may continue the customer record search with other entities upon an inability to locate a customer record within local data store 308. Alternatively, the POS terminal 314 may be configured to search multiple data stores for retrieving customer preference information from multiple customer records. Additionally, the application may create the customer record upon an inability to retrieve the customer record and store the customer record in the local data store or the retailer data store According to another embodiment, the POS terminal 314 may continue with another customer ID search 304 with other entities such as a retailer data store 302. The retailer data store 302 may be a common database utilized by multiple POS. As such, the retailer data store 302 may have additional customer preference information such as customer sales transaction history from multiple POS locations. The retailer data store 302 may transmit a customer record 306 upon matching the customer ID to a stored customer record. Alternatively, the POS terminal 314 may query a social networking application 322 with a customer ID search 316. The social networking application 322 may have a customer record 318 containing customer preference information. The customer record 318 from the social networking application 322 may have additional information such as customer interaction information with other users of the social networking application. An example may be gifts sent to other users of the social networking application. Upon matching the customer ID 316 to the customer record 318, the social networking application 322 may transmit the customer record 318 to the POS terminal 314.

According to an embodiment, an application may manage the targeted customer loyalty promotions at the POS location. The application may transmit one or more customer loyalty promotions to the customer device. Alternatively, the application may transmit the customer loyalty promotions to another customer device. An example of another device may be a tablet device with a larger screen to aid ease of viewing multiple customer loyalty promotions.

According to another embodiment, the application may analyze a customer purchase history from the customer record and evaluate a social loyalty preference from the customer record. The social loyalty preference may include information from a customer's user profile at a social networking application. Additionally, upon detecting the customer device in a retailer location, the application may determine a previous customer loyalty promotion associated with the customer record and a social loyalty preference from the customer record. The application may combine the previous customer loyalty promotion and social loyalty preference to create the customer loyalty promotion. Alternatively, the application may retrieve a list of active customer loyalty promotions from a retailer and determine the customer loyalty promotion to send to the customer device from the list of active customer loyalty promotions.

According to other embodiments, the application may transmit a receipt of a purchase transaction and the customer loyalty promotion within an email message. Additionally, the application may provide a web service interface for an advertising service to access the customer record. The application may receive the customer loyalty promotion from the advertising service through the web service interface.

According to further embodiments, the application may enroll the customer to a service of the social networking application. The application may provide third party access to the service to deliver the customer loyalty promotion. The third party may access the social networking application in order to deliver the customer loyalty promotion to the customer's user profile. Additionally, the application may replace personal information in the customer record with anonymous information. In an example embodiment, the application may replace credit card numbers and user identifiers with a character such as an asterisk during access by third party.

Figure 4:
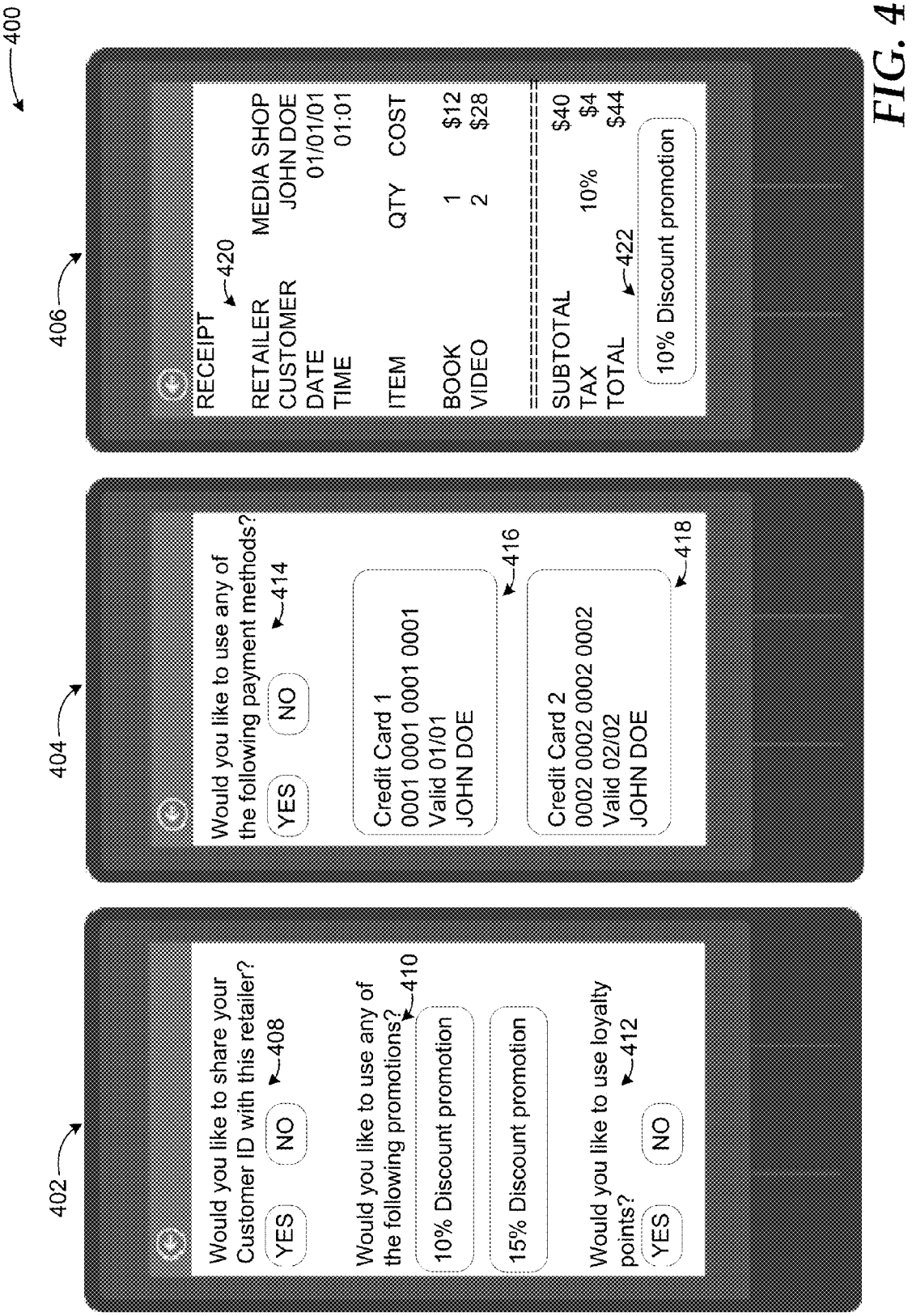
FIG. 4 illustrates example user interfaces displaying targeted customer loyalty promotions according to embodiments.

FIG. 4 illustrates example user interfaces displaying targeted customer loyalty promotions according to embodiments. Diagram 400 displays multiple example user interfaces of a mobile device screen.

According to an embodiment, mobile device 402 may present a user with a question whether they would like to share a customer ID associated with the mobile device 402 with a retailer store 408. The inquiry may be triggered upon proximity to the retailer. The mobile device 402 may display generated customer loyalty promotions through another inquiry 410. Additionally, the mobile device may inquire whether the customer would like to use loyalty points to pay for a transaction 412 at the retailer.

According to another embodiment, a mobile device 404 may display an inquiry 414 to determine customer payment methods. The payment methods may be associated with the customer loyalty promotions. Examples may include credit cards that register points for transactions. The user interface may display example credit cards 416 and 418 and await a user selection to complete a payment with the selected credit card.

According to yet another embodiment, a mobile device 406 may display a receipt 420 of a customer transaction. The mobile device 406 may display an integrated customer loyalty promotion 422 with the receipt. The customer loyalty promotion may promote a future sale at the retailer. Additionally, the customer loyalty promotion may generate advertising revenue for the advertising services generating the customer loyalty promotion.

According to some embodiments, an application may manage the targeted customer loyalty promotion at a location of the sale. The customer device may be an NFC enabled mobile phone. The application may receive the customer ID from the mobile phone through near field communications (NFC). The application may determine payment options associated with the customer loyalty promotion and transmit the payment options to the customer device through NFC for displaying at the end of a sale transaction. Additionally, the application may receive a selected payment option through NFC, determine another customer loyalty promotion associated with the selected payment option, and transmit the other customer loyalty promotion through NFC. The application may provide the other customer loyalty promotion to promote future sales.

According to a further embodiment, the application may receive a for-sale item identifier from the customer device through Bluetooth, Wi-Fi, RFID, infrared signal, or similar communications. The application may determine a customer loyalty promotion associated with the for-sale item identifier and transmit the customer loyalty promotion to the customer device.

According to other embodiments, the application may retrieve customer transactions including a price scan of a for-sale item identifier from the customer record. The application may determine the customer loyalty promotion associated with the customer transaction. Alternatively, the application may retrieve customer sales information including interactions with a for-sale item identifier from the NFC enabled mobile phone. The application may determine a customer loyalty promotion associated with the customer sales information.

Figure 5:
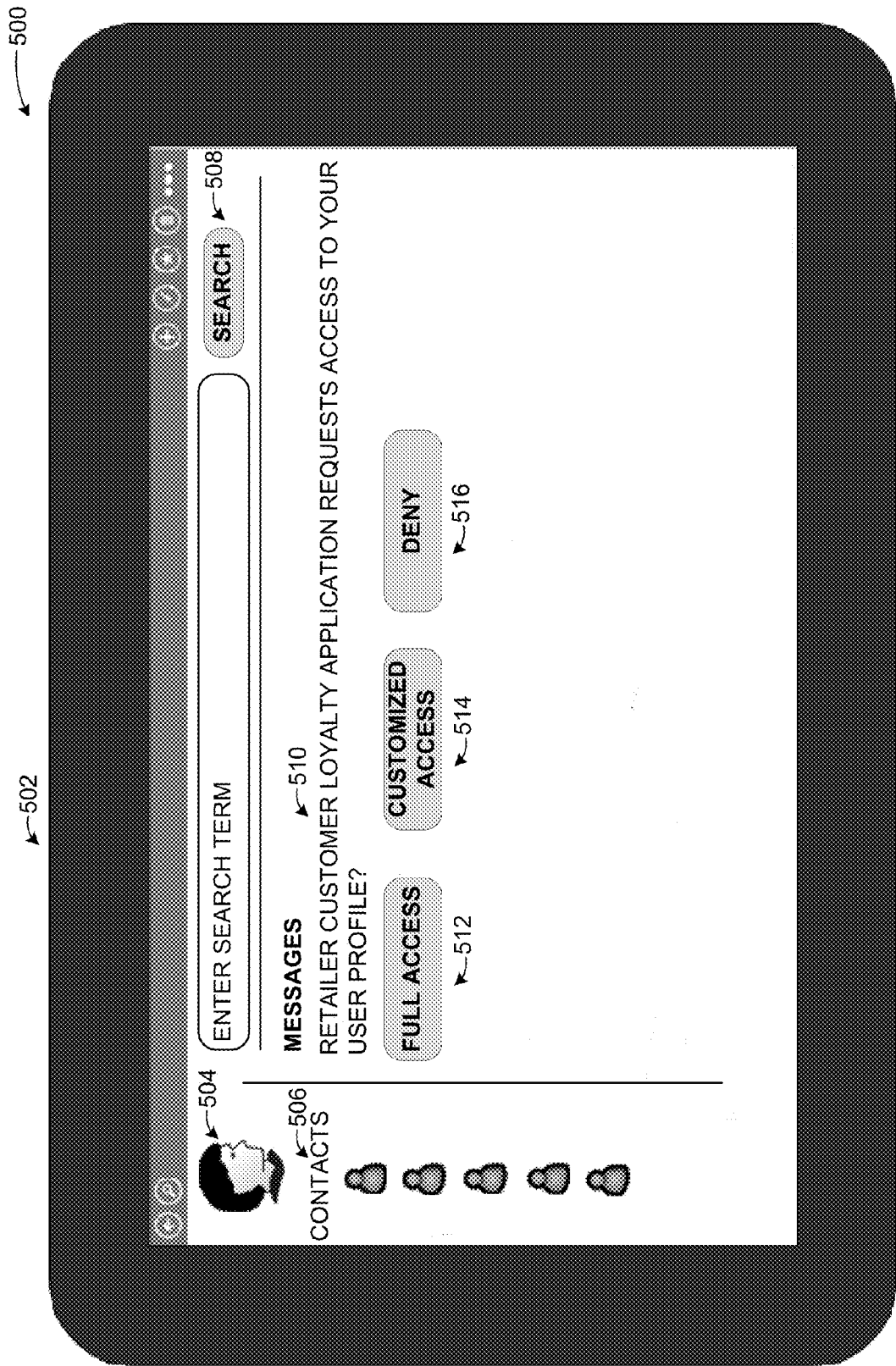
FIG. 5 illustrates another example user interface managing access to targeted customer loyalty promotions according to other embodiments.

FIG. 5 illustrates another example user interface 500 managing access to targeted customer loyalty promotions according to other embodiments. User interface 500 is a social networking application user interface on a customer device 502 such as a tablet. The social networking application user interface may display an icon 504 representing the customer. Contacts 506 of the customer may also be displayed. Additionally, the social networking application may display search interface 508 to browse the social networking application user information.

The social networking application may inquire (510) the customer whether they would like to grant access to the customer's user profile. The grant access inquiry may be for a service to interact with external customer loyalty promotion providers. The external customer loyalty promotion providers may interact with the customer's social networking profile to retrieve customer preference information. The customer may provide full (512) or customized (514) access. Customized (514) access may limit exposure of customer's user profile information such as private information. Alternatively, the customer may deny (516) the third party's user profile access request 510.

Figure 6:
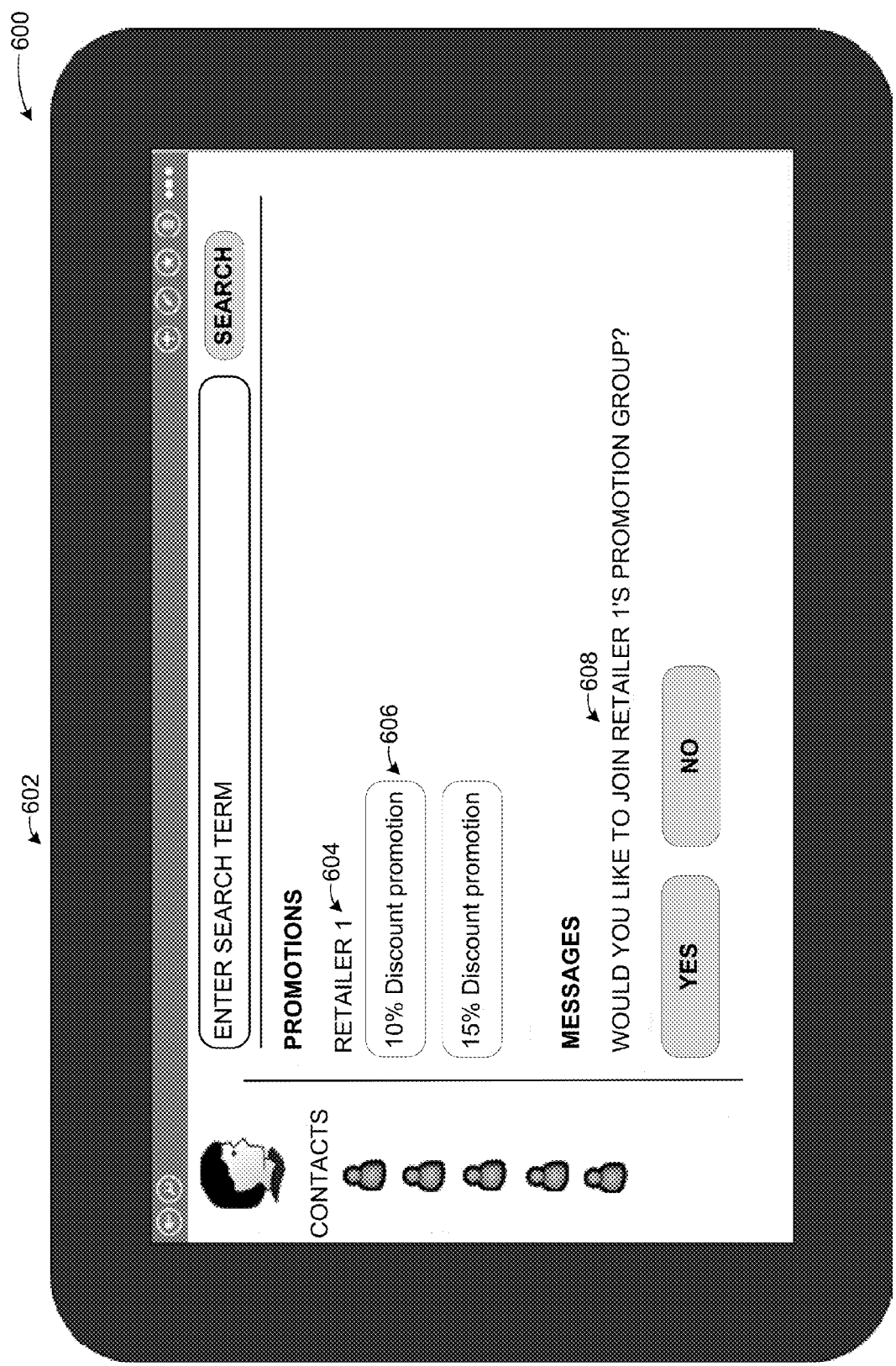
FIG. 6 illustrates yet another example user interface displaying targeted customer loyalty promotions according to some embodiments.

FIG. 6 illustrates yet another example user interface 600 displaying targeted customer loyalty promotions according to some embodiments. The customer device 602 may display customer loyalty promotions formatted for optimum display according to the customer device's display screen's requirements.

The customer device 602 may display customer loyalty promotions 606 associated with a retailer 604. The customer loyalty promotions may be displayed through a social networking application user interface. The customer loyalty promotions 606 may be specific to a store of the retailer 604. Alternatively, the customer loyalty promotions may be usable at any POS location within the retailer's network. The social networking application user interface may also inquire (608) whether to enable services such as joining the retailer's promotion group to receive subsequent customer loyalty promotions.

The example customer ID, customer record, customer loyalty promotions, and configurations depicted in FIGS. 1 through 6 are provided for illustration purposes only. Embodiments are not limited to the shapes, forms, and content shown in the example user interfaces, and may be implemented using other textual, graphical, and similar schemes employing the principles described herein.

Figure 7:
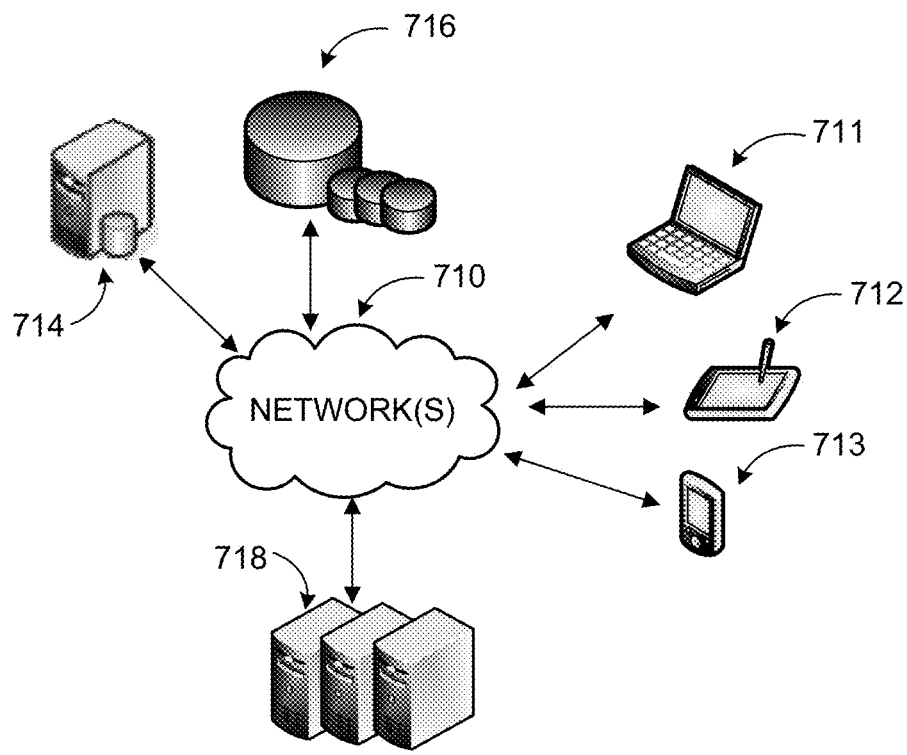
FIG. 7 is a networked environment, where a system according to embodiments may be implemented.

FIG. 7 is a networked environment, where a system according to embodiments may be implemented. In addition to locally installed applications, such as application 822 discussed below, managing targeted customer loyalty promotions may be also be employed in conjunction with hosted applications and services that may be implemented via software executed over one or more servers 706 or individual server 708. A hosted service or application may communicate with client applications on individual computing devices such as a handheld computer 701, a desktop computer 702, a laptop computer 703, a smart phone 704, a tablet computer (or slate), 705 ('client devices') through network(s) 710 and manage a customer loyalty promotion presented to customers.

As previously discussed, a customer loyalty promotion may be managed by the hosted service or application. The customer loyalty promotion may be generated from an analysis of a customer record received from a local data store, a retailer data store, a social networking application, etc.

Client devices 701-705 are used to access the functionality provided by the hosted service or application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network(s) 710 provides communication between the nodes described herein. By way of example, and not limitation, network(s) 710 may include wireless media such as acoustic, RF, infrared and other wireless media.

Many other configurations of computing devices, applications, data sources, and data distribution systems may be employed to manage targeted customer loyalty promotions. Furthermore, the networked environments discussed in FIG. 7 are for illustration purposes only. Embodiments are not limited to the example applications, modules, or processes.

Figure 8:
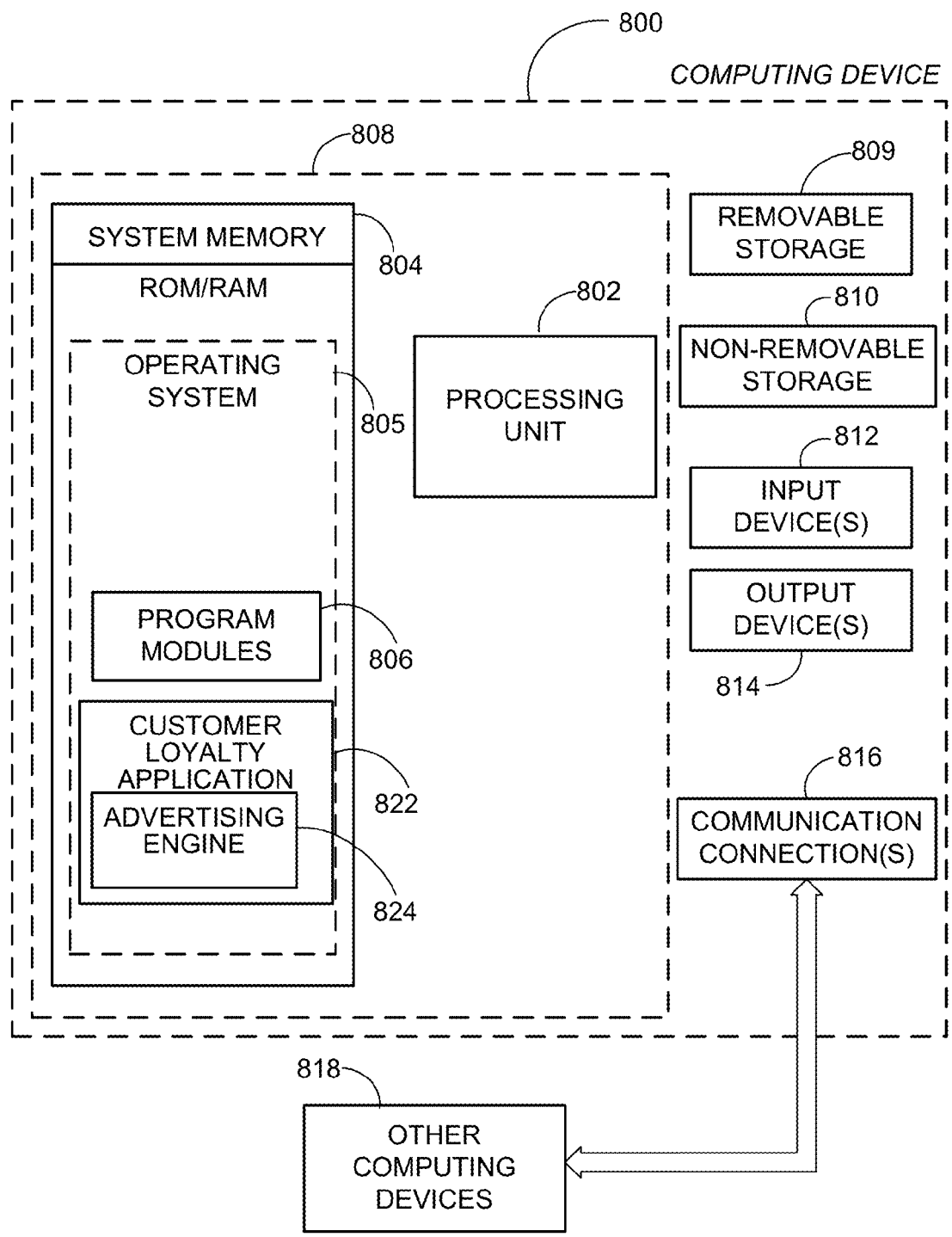
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment according to embodiments is illustrated, such as computing device 800. In a basic configuration, computing device 800 may be any point of sale (POS) device in stationary, mobile, or other form such as the example devices discussed in conjunction with FIG. 1, and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS ®, WINDOWS MOBILE®, or WINDOWS PHONE® operating systems from MICROSOFT CORPORATION of Redmond, Washington. The system memory 804 may also include one or more software applications such as program modules 806, customer loyalty application 822, and advertising engine 824.

Advertising engine 824 may operate in conjunction with the operating system 805 or application 822 and create customer loyalty promotions as discussed previously. Advertising engine module 824 may also receive third party generated customer loyalty promotions. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, an optical capture device for detecting gestures, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that execute communication applications, other directory or policy servers, and comparable devices. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
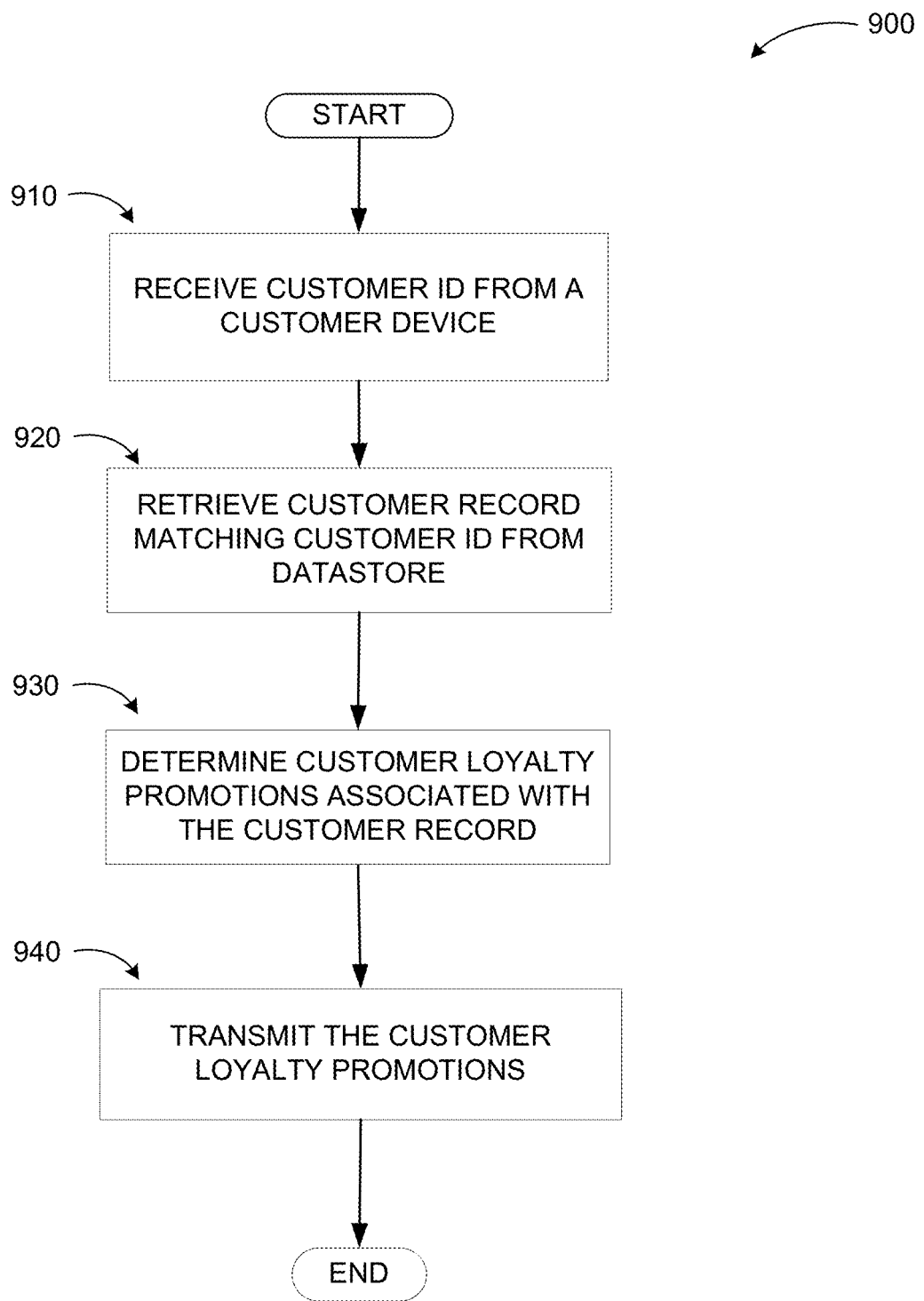
FIG. 9 illustrates a logic flow diagram for a process of managing targeted customer loyalty promotions according to embodiments.

FIG. 9 illustrates a logic flow diagram for a process of managing targeted customer loyalty promotions according to embodiments. Process 900 may be implemented as part of an application or an operating system of any computing device capable of receiving customer ID, customer records, customer transaction information and customer loyalty promotions.

As mentioned previously, near field communication (NFC) embedded in a mobile phone or similar device may be used to provide a customer ID in a retail environment. A retailer may use the ID to query a social network and obtain minimum information to create a customer record where it did not previously exist. The universal customer ID may then be used as an alias to reference the retailer's own customer ID moving forward. Customers may use this ID at multiple retailers that support the customer lookup system. Customer preferences as indicated on the social network may then be coupled with items purchased to generate strategic advertisements with maximum relevance for the customer. The advertisements or promotions may be sent to the customer along with a receipt for the transaction via email. Upon returning to the retailer, the customer may "check in" to view relevant active promotions based on buying history, preferences and offers previously included with receipts sent via email. The promotions can then be redeemed at the point of sale at the time of purchase through the same NFC interaction that provides the customer ID.

Process 900 begins with operation 910, where an application managing customer loyalty promotions may receive a customer ID from a customer device. Receiving the customer ID may be triggered by proximity of the customer device to a sale location such as a check-out counter. Subsequently, the application may retrieve a customer record matching the customer ID from a data store at operation 920. The data store may be a local data store, a retailer data store, or a social networking application. Next, the application may determine customer loyalty promotions associated with the customer record at operation 930. The application may analyze the customer record for customer history information to determine customer preference information. At operation 940, the application may transmit customer loyalty promotions to the customer. The transmission may be through NFC and may include payment options.

The operations included in process 900 are for illustration purposes. Managing targeted customer loyalty promotions according to embodiments may be implemented by similar processes with fewer or additional steps, as well as in different order of operations using the principles described herein.

According to some embodiments, a retail customer record may be created through social loyalty web service lookup. At point of sale or similar locations, a three-tiered customer search may be performed with social loyalty web service as the third tier. A universal customer identifier may be used for customer lookup at retail point of sale and customer purchase history and social loyalty preferences may be used to email promotions and/or push promotions to a mobile device for redemption through the point of sale. Advertisement services may enable retailers to formulate promotions and publish to web service which interfaces with a social network to deliver advertisements to customers based on social network interests and purchase history. Customers may be enrolled into a social network application, which may be accessed by retailers for customer record creation and an advertising network may deliver customer specific promotions.

In some embodiments, near field communications (e.g. through the customer's mobile device) may be used to communicate customer identifier with no prior customer record existing in the retailer's system. Customer specific, current promotions may be delivered to the customer upon entry at a retailer's site based on previously offered promotions and promotions applicable to the customer's stated interests via a social network. Moreover, email may be used to deliver a customer purchase record with promotions based on social network interests and purchase history. Customer access to club retailers may also be enabled through a near field communications enabled mobile phone. Furthermore, ad hoc transaction retrieval may be enabled from the cloud based on customer identifier entry via a near field communication enabled mobile device.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for managing targeted customer loyalty promotions for a customer in an interactive manner between a point of sale (POS) device and a customer communication device, the method comprising:
   detecting the customer communication device at a retail location associated with the POS device;
   requesting authorization to retrieve a customer identifier (ID) from the customer communication device;
   receiving the authorization to retrieve the customer ID from the customer communication device;
   receiving the customer ID from the customer communication device;
   retrieving a customer record matching the customer ID from one or more of: a social networking application, a retailer data store, and a local data store of the customer communication device;
   determining one or more customer loyalty promotions associated with the customer record;
   formatting the one or more customer loyalty promotions based on at least one requirement of a display screen of the customer communication device for an optimum presentation on the customer communication device;
   making the one or more customer loyalty promotions available to the customer; and
   upon receiving a customer selection from the customer communication device, applying a selected customer loyalty promotion.

2. The method of claim 1, wherein making the one or more customer loyalty promotions available comprises one or more of:
   transmitting the one or more customer loyalty promotions to the customer communication device;
   transmitting the one or more customer loyalty promotions to another customer device; and
   presenting the one or more customer loyalty promotions one a social network user interface associated with the customer.

3. The method of claim 1, wherein determining the one or more customer loyalty promotions further comprises:
   analyzing a customer purchase history from the customer record; and
   evaluating at least one loyalty preference from the customer record.

4. The method of claim 1, further comprising:
   determining at least one previous customer loyalty promotion associated with the customer record;
   determining at least one loyalty preference from the customer record; and
   determining the at least one customer loyalty promotion from the at least one previous customer loyalty promotion and the at least one loyalty preference.

5. The method of claim 1, further comprising:
   transmitting at least one from a set of: a customer purchase receipt and the at least one customer loyalty promotion within an email message to the customer.

6. The method of claim 1, further comprising:
   providing a web service interface for at least one advertising service to access the customer record; and
   receiving the at least one customer loyalty promotion from the at least one advertising service through the web service interface.

7. The method of claim 1, further comprising:
   if the customer record is unavailable for retrieval, creating a new customer record; and
   storing the new customer record in at least one from a set of: the local data store of the customer communication device and the retailer data store.

8. The method of claim 1, further comprising:
   replacing personal information in the customer record with anonymous information.

9. The method of claim 1, further comprising:
   retrieving a list of active customer loyalty promotions from the retailer; and
   determining the one or more customer loyalty promotions from the list of active customer loyalty promotions.

10. A computing device for managing targeted customer loyalty promotions for a customer in an interactive manner between a point of sale (POS) device and a customer communication device, the computing device comprising:
    a memory;
    a communication connection; and
    a processor coupled to the memory and the communication connection, the processor executing an application and causing services associated with the application to generate customer loyalty promotions, wherein the processor is configured to:
       detect the customer communication device at a retail location associated with the POS device;
       request authorization to retrieve a customer identifier (ID) from the customer communication device;
       receive the authorization to retrieve the customer ID from the customer communication device;
       receive the customer ID from the customer communication device;
       retrieve a customer record matching the customer ID from at least one from a set of: a local data store of the customer communication device, a retailer data store, and a social networking application;
       determine one or more customer loyalty promotions associated with the customer record;
       integrate the one or more customer loyalty promotions to a receipt of a purchase transaction associated with the customer;
       transmit the receipt including the one or more customer loyalty promotions to the customer communication device; and
       cause the customer communication device to display a request for enablement of a service including joining a promotion group of the retailer to receive a subsequent customer loyalty promotion.

11. The computing device of claim 10, wherein the processor is further configured to:
    receive the customer ID from the customer communication device through near field communications (NFC) with the POS device.

12. The computing device of claim 11, wherein the processor is further configured to:
    determine at least one payment option associated with the one or more customer loyalty promotions; and
    transmit the at least one payment option to the customer communication device through NFC.

13. The computing device of claim 12, wherein the processor is further configured to:
    receive a selected payment option from the customer communication device through NFC;

determine another customer loyalty promotion associated with the selected payment option; and transmit the other customer loyalty promotion to the customer communication device through NFC.

14. The computing device of claim 10, wherein the processor is further configured to:

receive a for-sale item identifier from the customer communication device through NFC; and determine the at least one customer loyalty promotion associated with the for-sale item identifier.

15. A computing device for managing targeted customer loyalty promotions for a customer in an interactive manner between a point of sale (POS) device and a customer communication device, the computing device comprising:

a memory;

a communication connection; and a processor coupled to the memory and the communication connection, the processor executing an application and causing services associated with the application to generate customer loyalty promotions in communication with the POS device, wherein the processor is configured to:

receive a customer identifier (ID) from the customer communication device on a customer through near field communications (NFC) in proximity to the POS device of a retailer;

retrieve a customer record matching the customer ID from at least one from a set of: a local data store of the customer communication device, a retailer data store, and a social networking application;

determine at least one customer loyalty promotion associated with the customer record;

format the at least one customer loyalty promotion based on at least one requirement of a display screen of the customer communication device for an optimum presentation on the customer communication device;

transmit at least one payment option associated with the at least one customer loyalty promotion to the customer communication device through NFC;

integrate the at least one customer loyalty promotion to a receipt of a purchase transaction associated with the customer;

transmit the receipt including the at least one customer loyalty promotion to the customer communication device through NFC; and cause the customer communication device to display a request for enablement of a service including joining a promotion group of the retailer to receive a subsequent customer loyalty promotion.

16. The computing device of claim 15, wherein the processor is further configured to:

retrieving customer transactions including at least one price scan of a for-sale item identifier from the customer record; and determining the at least one customer loyalty promotion from the customer transactions.

17. The computing device of claim 15, wherein customer communication device is an NFC enabled mobile phone.

18. The computing device of claim 17, wherein the processor is further configured to:

retrieve customer sales information including interactions with at least one for-sale item identifier from the NFC enabled mobile phone; and determine the at least one customer loyalty promotion from the customer sales information.

* * * * *